United States Patent
Matsumoto et al.

[11] Patent Number: 6,147,974
[45] Date of Patent: Nov. 14, 2000

[54] APPARATUS FOR MONITORING STATE OF TRAFFIC IN TELECOMMUNICATION NETWORK

[75] Inventors: Kazunori Matsumoto; Kazuo Hashimoto, both of Saitama, Japan

[73] Assignee: Kokusai Denshin Denwa Co., Ltd., Tokyo, Japan

[21] Appl. No.: 09/031,913

[22] Filed: Feb. 27, 1998

[30] Foreign Application Priority Data

Mar. 4, 1997 [JP] Japan .................................... 9-063965

[51] Int. Cl.⁷ ....................................................... H04J 3/14
[52] U.S. Cl. ........................................... 370/252; 379/139
[58] Field of Search .................................... 370/229, 230, 370/235, 236, 237, 241, 242, 244, 250, 252, 253, 254; 379/1, 9, 10, 13, 14, 15, 32, 34, 133, 134, 139

[56] References Cited

U.S. PATENT DOCUMENTS

| | | | |
|---|---|---|---|
| 5,459,777 | 10/1995 | Bassa et al. ............................ | 379/133 |
| 5,919,898 | 6/1999 | Bassa et al. ............................ | 379/133 |

OTHER PUBLICATIONS

"Sequential Multiple Hypothesis Test for Fault Detection in Reactor Noise Signals", Glöckler, *8th Power Plant Dynamics, Control and Testing Symposium*, May 27–29, 1992, pp. 1—14.

*Primary Examiner*—Huy D. Vu
*Attorney, Agent, or Firm*—Arent Fox Kintner Plotkin & Kahn PLLC

[57] ABSTRACT

An apparatus for monitoring state of traffic in a telecommunication network by calculating ABR based upon BID and ANS per unit time in the network. This apparatus includes a model generation unit for receiving sampled data for generating models, the sampled data being constituted by a set of pairs of BID and ANS per unit time when the network is normal, and for calculating an average connection ratio when the network is normal based upon the sampled data, a calculation unit for calculating log-likelihood at a single point under hypothesizes of normality and degradation of the network based upon time series BID and ANS and upon the average connection ratio calculated by the model generation unit, and a detection unit for detecting whether state of traffic in the network is normal or degraded based upon time series log-likelihood of under hypothesizes of normality and degradation calculated by the calculation unit.

5 Claims, 5 Drawing Sheets

---- : THRESHOLD WHEN $\varepsilon=0.3$

—·— : THRESHOLD WHEN $\varepsilon=0.5$

—— : THRESHOLD WHEN $\varepsilon=0.8$

APPARATUS FOR MONITORING STATE OF TRAFFIC IN TELECOMMUNICATION NETWORK

FIELD OF THE INVENTION

The present invention relates to an apparatus for monitoring state of traffic in a telecommunication network, particularly to an apparatus for detecting normality or degradation in a telecommunication network by calculating ABR (Answer Bid Ratio) based upon BID (the number of connection-requesting calls) and ANS (the number of connection-completed calls) per unit time in the network.

DESCRIPTION OF THE RELATED ART

As for management of state of communication traffic in international networks, ITU, CCITT, RED BOOK, Volume II, Fascicle II.3 (1985), pp.5–81 or ITU, Recommendations E.401–E.427, BLUE BOOK, Volume II, Fascicle II.3 (1989) defines that any international telecommunication carrier has to measure ABR of each telecommunication common carrier and to examine whether degradation of circuits or abrupt increase of traffic may be occurred or not when the measured ABR decreases. BID and ANS are defined in the above-mentioned BLUE BOOK.

FIGS. 1a to 1c show time series ABR, BID and ANS during one day in a certain country.

In FIG. 1a, a dotted line and a dot-dash line indicate degradation thresholds with two stages, respectively. These thresholds are dictated by experience of operators for monitoring state of the telecommunication networks based upon the past data in the country. During a time period with increased BID in a day such as from 5:00 p.m. to 7:00 p.m. as shown in FIG. 1b, higher thresholds are used so as to smoothly monitor the traffic state.

However, during a time period with extremely decreased BID such as from 1:00 a.m. to 7:00 a.m., ABR changes greatly as shown in FIG. 1a. This phenomenon is caused by the calculation method of ABR, in which the ABR is obtained from a ratio of ANS and BID (ABR=ANS/BID). During a time period when both the ANS and BID increase, ABR will not greatly vary. Whereas, during a time period when both the ANS and BID extremely decrease, ABR will vary greatly.

Therefore, during the latter time period, although the state of communication traffic is not so degraded, ABR will ve ry frequently across the thresholds. This causes the operators who monitor state of telecommunication networks to fall into difficulties for finding significant degradation. A great deal of experience will be required for the operators to determine optimum thresholds to correctly issue an alarm about degradation in the networks. Also, a much expense of effort will be required to determine thresholds for each of a large number of destinations to be monitored.

FIG. 2 illustrates relationships between measured points and a thresh old function in an optional time period according to a conventional degradation detection method. In this method, the threshold function constituted by a straight line passing through the origin of BID-ANS characteristics is determined by operators' experience , and degradation of communication traffic state is detected if the measured points during a time period locate under the threshold line. Since the thresholds are determined depending upon operators' experience, it is very difficult to automatically provide threshol ds in accordance with statistic a l calculat io n technique. Also, since ABR obtained from ANS and BID changes non-linearly, it is not desired to compare the ABR with the straight threshold line. In addition, since distances between the measured points and the threshold line (X and Y in the figure for example) differ with each other depending upon BID, it is impossible to keep the same accuracy for degradation detections. For example, measured points with small BID are close to the threshold line causing strict decision, but measured points with large BID are far from the threshold line causing lenient decision.

There is another conventional method for detecting degradation, which can solve the above-mentioned problems.

In th is degradation detection method, traffic to the telecommunication common carrier is further classified according to types of calls. Suppose call types are indicated by $C_1, C_2, \ldots, C_i, C_j, \ldots, C_n$ ($C_i \cap C_j = 0$), BIDs of the respective call types during a time period T are indicated by $Bid_1, Bid_2, \ldots, Bid_i, \ldots, Bid_n$, and ANSs of the respective call types during the time period T are indicated by $Ans_1, Ans_2, \ldots, Ans_i, \ldots, Ans_n$. Also suppose the following hypothesis is held regardless of call types.

The following approximate expression of linear regression is held between $Bid_i^*$ obtained by variable conversion by square root of $Bid_i$ and $Ans_i^*$ obtained by variable conversion by square root of $Ans_i$:

$$Ans_i^* = a_i + Bid_i^* + b_i + e_i.$$

The distribution of residual ei can be approximated by a normal distribution, and a probability density function $E_i(x)$ of each $e_i$ can be obtained from an average value and a variance of the sampled data. Probabilities of that the calculated residuals of the respective call types are smaller than $e_1^o, e_2^o, \ldots$, respectively are given from:

$$P(e_1^o, e_2^o, \ldots) = \int_{-\infty}^{e_1^o} E_1(x) dx \cdot \int_{-\infty}^{e_2^o} E_2(x) dx \cdots$$

where $bid_i^o$ denotes the measured value of $Bid_i$, $ans_i^o$ denotes the measured value of Ans, and $e^o$ is given as $e^o = (a\, bid_i + b_i) - \sqrt{ans_i}$.

When $P(e_1, e_2, \ldots)$ is less than a value $\eta$ predetermined for each of telecommunication common carriers to be monitored, it is detected that there may be network fault.

However, according to the above-mentioned conventional method, sufficient accuracy for degradation detection cannot be expected, and furthermore because of due to time interval detection, no degradation detection is possible when slightly worse state of communication traffic continues for a long time.

SUMMARY OF THE INVENTION

It is therefore an object of the present invention to provide an apparatus for monitoring state of traffic in a telecommunication network, whereby sufficient accuracy for degradation detection can be expected, and degradation detection is possible even when slightly worse state of communication traffic continues for a long time.

According to the present invention, an apparatus for monitoring state of traffic in a telecommunication network by calculating ABR based upon BID and ANS per unit time in the network is provided. This apparatus includes a model generation unit for receiving sampled data for generating models, the sampled data being constituted by a set of pairs of BID and ANS per unit time when the network is normal, and for calculating an average connection ratio when the network is normal based upon the sampled data, a calculation unit for calculating log-likelihood at a single point under hypothesizes of normality and degradation of the network based upon time series BID and ANS and upon the average connection ratio calculated by the model generation unit, and a detection unit for detecting whether state of traffic in the network is normal or degraded based upon time series log-likelihood of under hypothesizes of normality and degradation calculated by the calculation unit.

According to the present invention, a relationship between BID and ANS is modeled based upon binomial distribution and state of traffic in the network is detected in accordance with the modeled relationship by using the SPRT (Sequential Probability Ratio Test) algorithm for example. Thus, automatic degradation detection can be realized with sufficient accuracy for detection. Also, degradation detection is possible even when slightly worse state of communication traffic continues for a long time. Furthermore, it is possible to generate degradation detection models which can be uniquely determined flexibly depending upon state in designations to be monitored.

Further objects and advantages of the present invention will be apparent from the following description of the preferred embodiments of the invention as illustrated in the accompanying drawings.

DESCRIPTION OF THE PREFERRED EMBODIMENTS

Figure 1A:
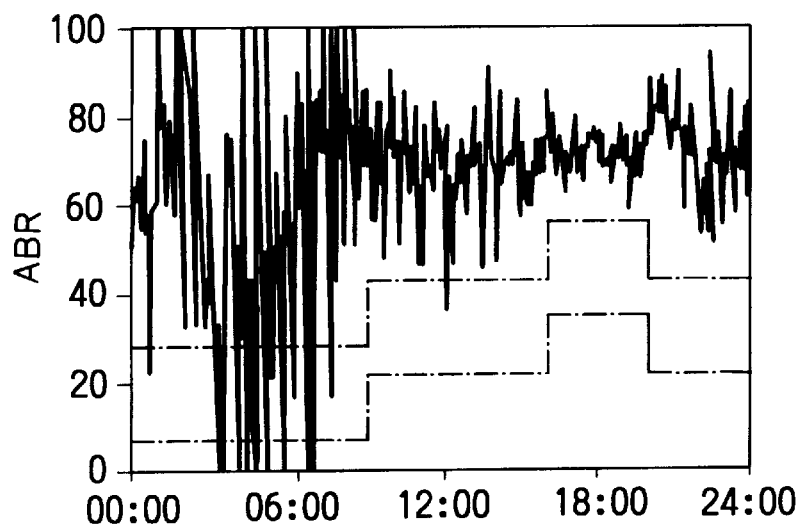
FIGS. 1a to 1c already described show time series ABR, BID and ANS of calls during one day in a certain country.
Figure 1B:
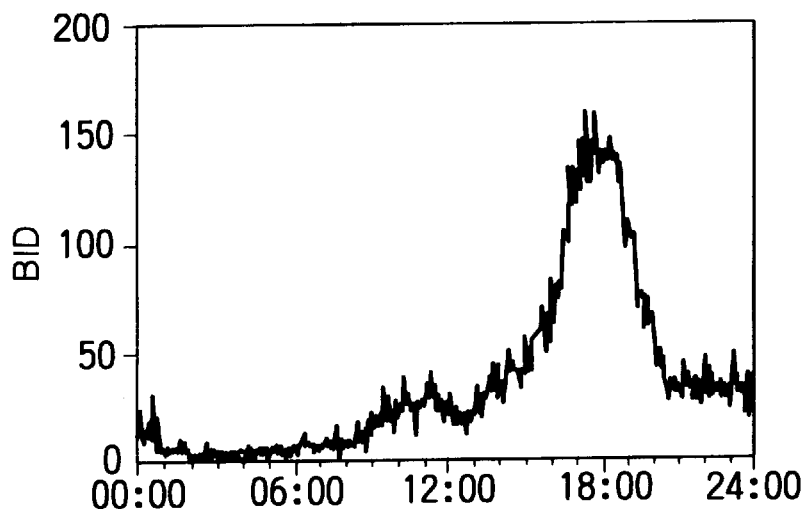
Figure 1C:
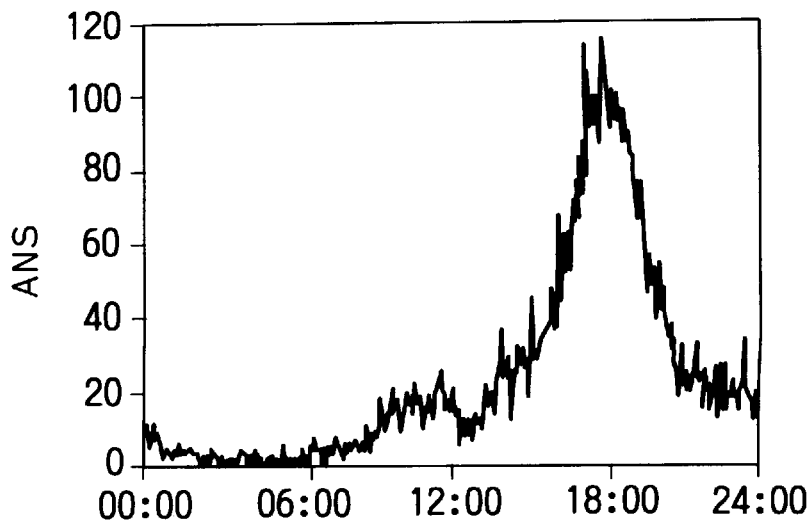
Figure 2:
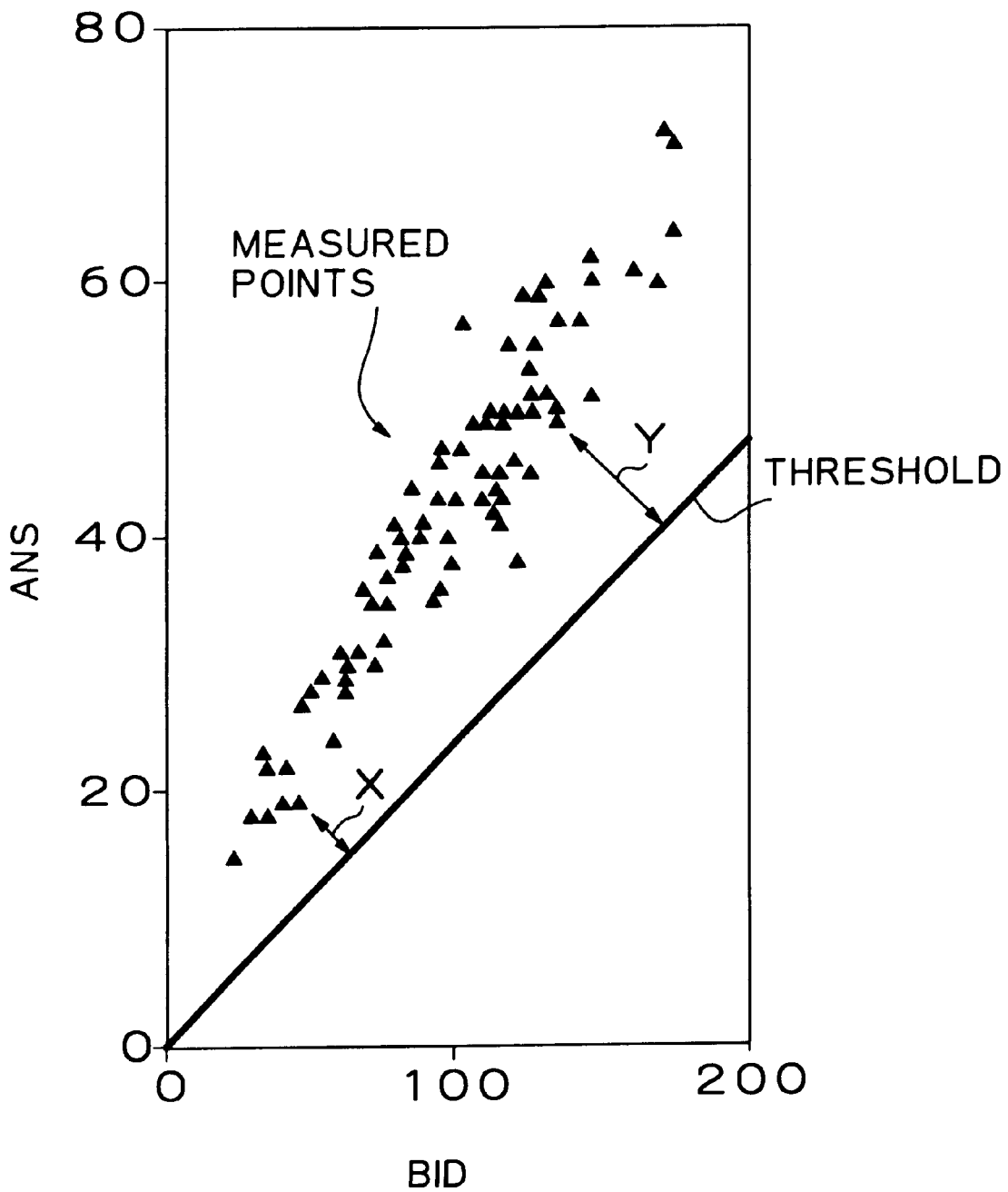
FIG. 2 already described shows relationships between measured points and a threshold function in an optional time period according to a conventional degradation detection method.
Figure 3:
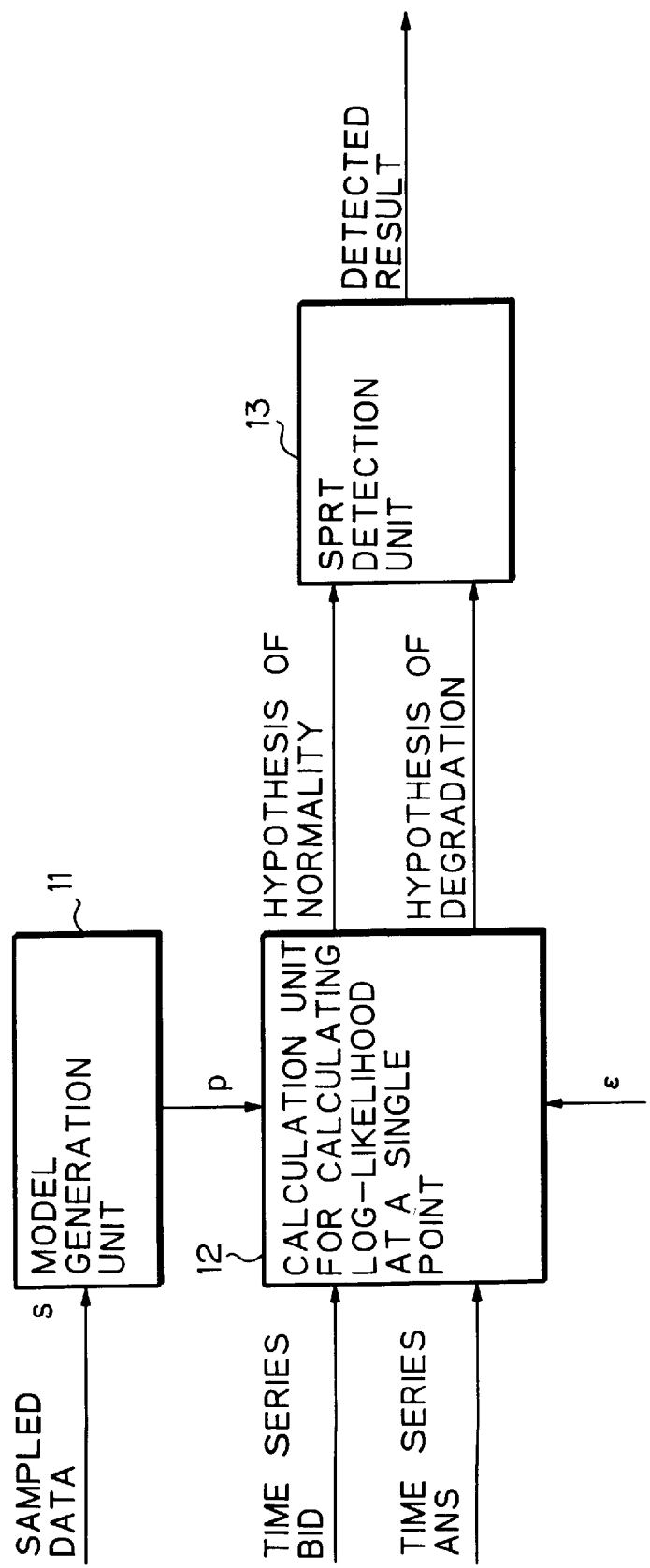
FIG. 3 shows a block diagram schematically illustrating a preferred embodiment of an apparatus for monitoring state of traffic in a telecommunication network according to the present invention.

FIG. 3 illustrates a preferred embodiment of an apparatus for monitoring state of traffic in a telecommunication network according to the present invention. In the figure, reference numeral 11 denotes a model generation unit, 12 a calculation unit for calculating log-likelihood at a single point and 13 a SPRT (Sequential Probability Ratio Test) detection unit.

In this embodiment, the relationship between BID and ANS is modeled based upon binomial distributions and state of traffic in the network is detected in accordance with the modeled relationship by using the SPRT algorithm, and thereafter models of optimum days groups are generated by using the AIC (Akaike's Information Criteria).

To the model generation unit 11, a set of pairs of BID and ANS when the network is normal $S=\{(b_1,a_1), (b_2,a_2)\}$ are inputted as sampled data for generating models. An average connection ratio when the network is normal $\hat{p}$ is calculated from the following equation.

$$\hat{p} = \Sigma_i^n a_i / \Sigma_i^n b_i$$

The calculation unit 12 calculates log-likelihood at a single point under hypothesizes of normality and degradation of the network at each time. The log-likelihood at a single point $ll(b,a|p)$ is calculated from:

$$ll(b, a \mid p) = \log({}_{b_i}C_{a_i} \cdot p^{a_i} \cdot (1-p)^{b_i - a_i})$$

where b and a denote measured values of BID and ANS, and p denotes a probability of successful connection. Therefore, the log-likelihood at a single point under hypothesizes of normality can be obtained from $ll(b,a|\hat{p})$. The log-likelihood at a single point under hypothesizes of degradation can be obtained from $ll(b,a|p_W)$ where $p_W$ denotes a probability of successful connection under degradation state expressed as follows:

$$p_W = \begin{cases} \varepsilon \times \hat{p} & \left(\text{when } \varepsilon \times \hat{p} < \dfrac{a}{b}\right) \\ \dfrac{a}{b} & \left(\text{when } \varepsilon \times \hat{p} \geq \dfrac{a}{b}\right) \end{cases}$$

where $\epsilon$ ($0<\epsilon<1$) denotes a sensitivity parameter determined for each destination to be monitored.

The SPRT detection unit 13 detects whether state of traffic in the network is normal or degraded by using the SPRT algorithm. This algorithm executes decision of normality or degradation based upon time series log-likelihood of under hypothesizes of normality and degradation. Since the SPRT algorithm can minimize measuring time for degradation detection with keeping a probability of missing degradation and a probability of erroneously detecting normality as for degradation less than a predetermined value, this algorithm is appropriate to use for monitoring state of telecommunication traffic.

In the binomial distribution, variance is proportional to square root of the number of trials. In the conventional technique, therefore, regression models are constituted in accordance with the result of square root conversion of BID and ANS, and the distribution of residual between the regression line and real values is approximated by a normal distribution. Table 1 shows log-likelihoods of the conventional art model based upon square root conversion and the present invention model based upon binomial distribution using 78 days data of the telecommunication common carriers in the respective destinations to be monitored, where the destinations A, B, C and D correspond to North America, Europe, Southeast Asia and Middle and Near East, respectively.

TABLE 1

| DESTINATIONS TO BE MONITORED | CONVERSION BY SQUARE ROOT (CONVENTIONAL ART) | BINOMINAL DISTRIBUTION (PRESENT INVENTION) |
|---|---|---|
| A | $-9.24 \times 10^9$ | $-4.66 \times 10^4$ |
| B | $-5.01 \times 10^5$ | $-8.76 \times 10^2$ |
| C | $-1.65 \times 10^5$ | $-1.31 \times 10^3$ |
| D | $-2.14 \times 10^6$ | $-1.49 \times 10^3$ |

As will be understood from this table, the log-likelihoods of the binomial distribution models according to the present invention are larger than and thus superior to the conventional art models in all the destinations.

Figure 4:
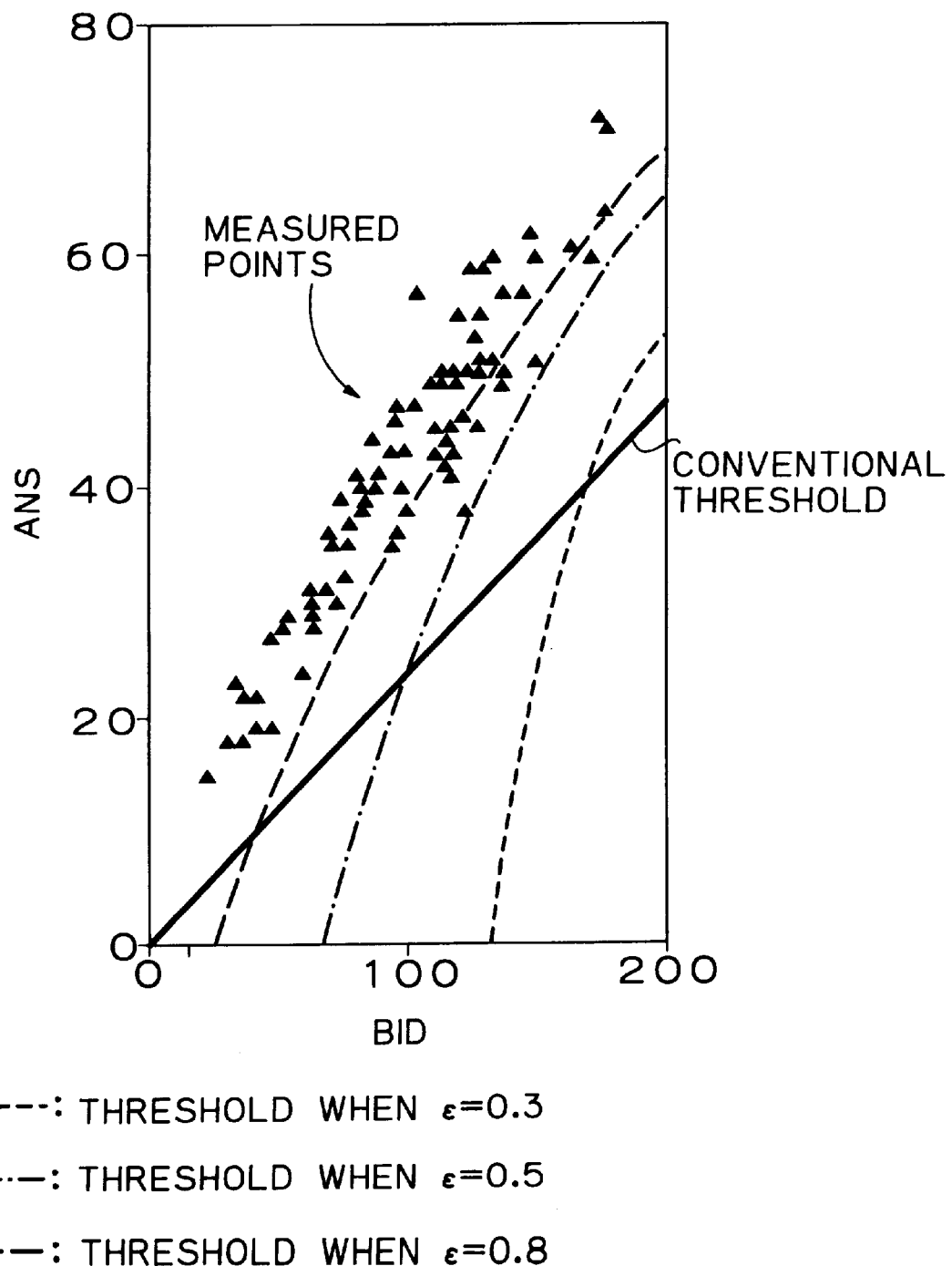
FIG. 4 shows relationships between measured points and threshold functions in an optional time period according to the present invention.

FIG. 4 shows thresholds of BID and ANS between the log-likelihood at a single point under hypothesizes of degradation ll(b,a|$p_W$) and the log-likelihood at a single point under hypothesizes of normality ll(b,a|$\hat{p}$) with different sensitivity parameters $\epsilon$. The degradation of communication traffic state is detected if the measured points during a time period locate under the selected threshold. By appropriately selecting the sensitivity parameter $\epsilon$, flexible and accurate detection of degradation can be expected in contradistinction with conventional art using the threshold line passing through the origin.

Hereinafter, generation of models of days groups based upon the AIC will be described.

Since ABR differs between weekday and holiday, accuracy of the models can be improved by generating models of days groups. However, too many models may introduce excessive learning. Also, it is necessary to consider that properties of the days may be different for each telecommunication common carrier.

Thus, models with various combinations of days groups are generated and optimum combinations of MON (Monday), TUE (Tuesday), WED (Wednesday), THU (Thursday), FRI (Friday), SAT (Saturday), SUN (Sunday) and FES (Festival day or public holiday) for the respective c arriers are obtained based upon the AIC. Following are the optimum combinations of days groups.

{MON,TUE,WED,THU,FRI,SAT,SUN,FES}
{MON,TUE,WED,THU,FRI}{SAT,SUN,FES}
{MON,TUE,WED,THU,FRI}{SAT,SUN}{FES}
{MON,TUE,WED,THU}{FRI}{SAT,SUN,FES}
{MON}{TUE,WED,THU,FRI}{SAT,SUN,FES}
{MON}{TUE,WED,THU,FRI}{SAT,SUN}{FES}
{MON}{TUE,WED,THU,FRI}{SAT}{SUN,FES}
{MON}{TUE,WED,THU}{FRI}{SAT,SUN,FES}
{MON}{TUE,WED,THU}{FRI}{SAT}{SUN,FES}
{MON}{TUE,WED,THU}{FRI}{SAT,SUN}{FES}
{MON}{TUE,WED,THU}{FRI}{SAT}{SUN}{FES}

Since the optimum combinations of days reflect the difference in time and in culture (for example, Friday is a holiday in Mohammedan countries), grouping of days based upon the AIC seems to be very effective.

Times of degradation detections with respect to time series of BID and ANS of the past 78 days for all the telecommunication common carriers are measured by varying the sensitivity parameter $\epsilon$.

Figure 5A:
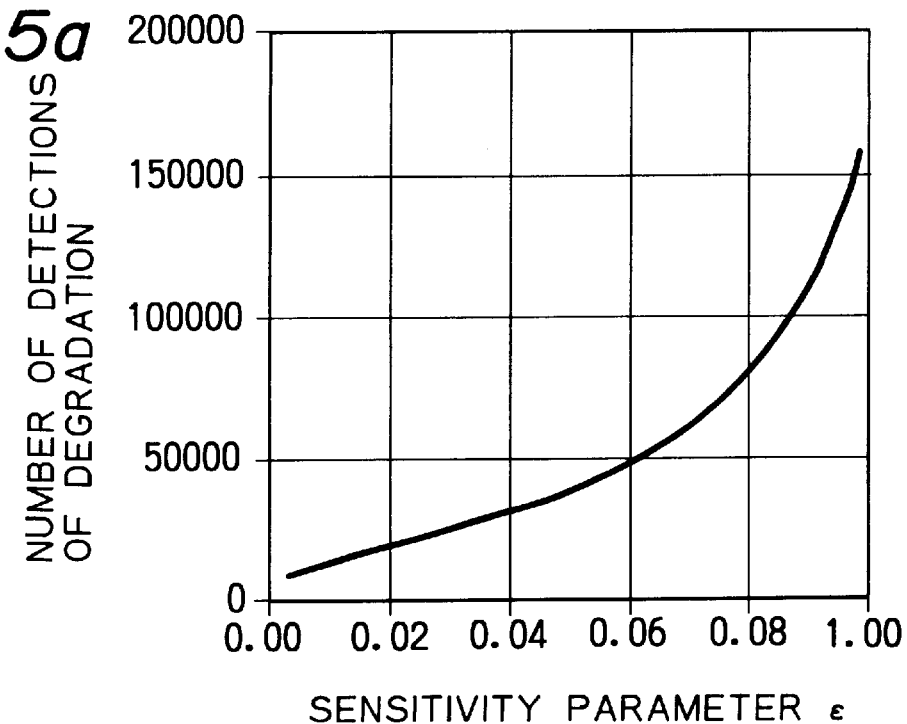
FIGS. 5a and 5b show characteristics of the number of detections of degradation versus sensitivity parameter $\epsilon$ and characteristics of the number of calls to be relieved versus sensitivity parameter $\epsilon$ according to the present invention.

FIG. 5a shows the number of detections of degradation with respect to the sensitivity parameter $\epsilon$. The parameter is more than 0.00 and less than 1.00. Therefore, FIG. 5a covers entire range of the value of the parameter $\epsilon$. As shown in this figure, when the parameter $\epsilon$ increases, the number of degradation detections monotonously increases. According to the conventional detection method, since the threshold has to determined for each telecommunication common carrier and for each day of week, the number of degradation detections cannot be controlled by a single parameter. Whereas, according to the present invention, thanks for that the value of the sensitivity parameter $\epsilon$ can be uniquely determined if an expected number of degradation detections is once defined, simple system operation can be presented.

Figure 5B:
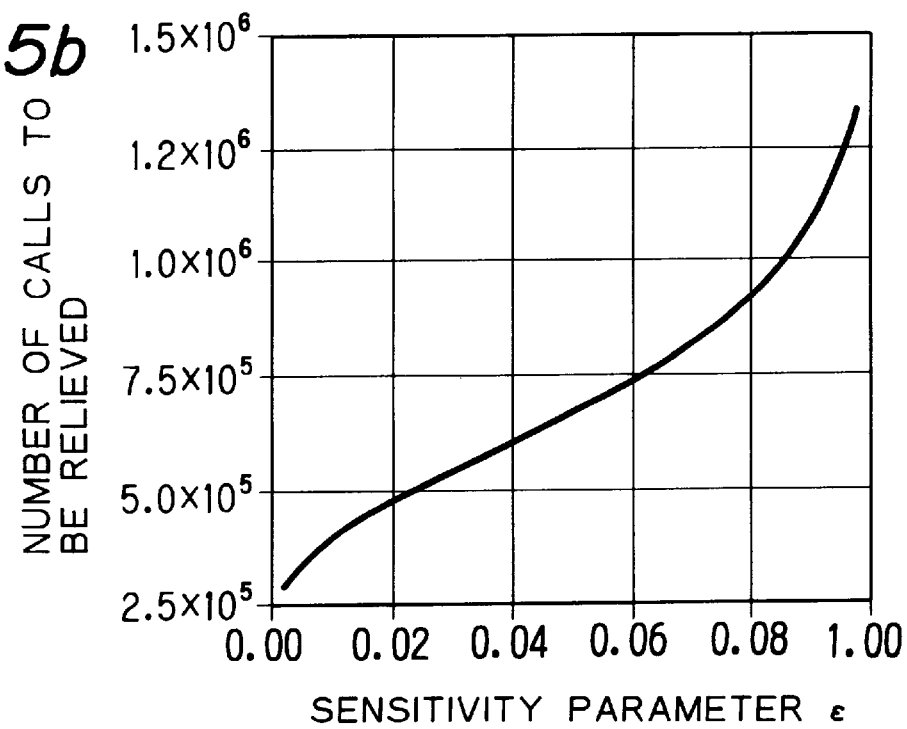

FIG. 5b shows relationship between the number of calls to be relieved and the sensitivity parameter $\epsilon$ on the assumption that the number of calls to be relieved is equal to the difference between the expected number of connection-completed calls (=BID×p) and ANS when degradation is detected. FIG. 5b also covers entire range of the value of the parameter $\epsilon$. As shown in the figure, when the parameter $\epsilon$ increases, the number of calls to be relieved monotonously increases. According to the conventional detection method, the number of calls to be relieved cannot be controlled by a single parameter. Whereas, according to the present invention, thanks for that the value of the sensitivity parameter $\epsilon$ can be uniquely determined if an expected number of calls to be relieved is once defined, simple system operation can be presented.

Degradation detections of telecommunication traffic according to the present invention and to the conventional detection method are in fact executed during the same period of time. According to the conventional method, the number of degradation detections is about 50,000 and the number of calls to be relieved when degradation is detected is about 490,000. According to the present invention, although the number of degradation detections is substantialy the same as that of the conventional method if $\epsilon$=0.6, the number of calls to be relieved is about 750,000 which is greater than that of the conventional method by about 260,000. Since the network control for relieving calls is executed when degradation in communication traffic is detected, the detection method according to the present invention with the greater number of calls to be relieved, although the number of degradation detections is the same, has higher performance in fault detection than the conventional method.

Many widely different embodiments of the present; invention may be constructed without departing from the spirit and scope of the present invention. It should be understood that the present invention is not limited to the specific embodiments described in the specification, except as defined in the appended claims.

What is claimed is:

1. An apparatus for monitoring state of traffic in a telecommunication network by calculating ABR based upon BID and ANS per unit time in the network, said apparatus comprising:

a model generation means for receiving sampled data for generating models, said sampled data being constituted by a set of pairs of BID and ANS per unit time when the network is normal, and for calculating an average connection ratio when the network is normal based upon the sampled data;

a calculation means for calculating log-likelihood at a single point under hypothesizes of normality and degradation of the network based upon time series BID and ANS and upon the average connection ratio calculated by said model generation means; and a detection means for detecting whether state of traffic in the network is normal or degraded based upon time series log-likelihood of under hypothesizes of normality and degradation calculated by said calculation means.

2. The apparatus as claimed in claim 1, wherein said model generation means includes means for calculating an average connection ratio when the network is normal $\hat{p}$ by from an equation of:

$$\hat{p}=\Sigma_i{}^n a_i/\Sigma_i{}^n b_i$$

where $a_i$ denotes time series ANS and $b_i$ denotes time series BID.

3. The apparatus as claimed in claim 1, wherein said calculation means includes means for calculating log-likelihood at a single point under hypothesis of normality from ll(b,a|$\hat{p}$) when log-likelihood at a single point ll(b,a|p) is defined as:

$$11(b,a|p) = \log(_{b_i}C_{a_i} \cdot p^{a_i} \cdot (1-p)^{b_i-a_i})$$

where b and a denote measured values of BID and ANS, and p denotes a probability of successful connection.

4. The apparatus as claimed in claim 1, wherein said calculation means includes means for calculating a probability of successful connection when the network is degraded $p_W$ from an equation of:

$$p_w = \begin{cases} \varepsilon \times \hat{p} & \left(\text{when } \varepsilon \times \hat{p} < \frac{a}{b}\right) \\ \frac{a}{b} & \left(\text{when } \varepsilon \times \hat{p} \geq \frac{a}{b}\right) \end{cases}$$

where b and a denote measured values of BID and ANS, $\hat{p}$ denotes an average connection ratio when the network is normal, and $\epsilon$ ($0<\epsilon<1$) denotes a sensitivity parameter.

5. The apparatus as claimed in claim 1, wherein said model generation means includes means for generating models for each combination of days groups based upon AIC.

\* \* \* \* \*